United States Patent Office 3,037,319
Patented June 5, 1962

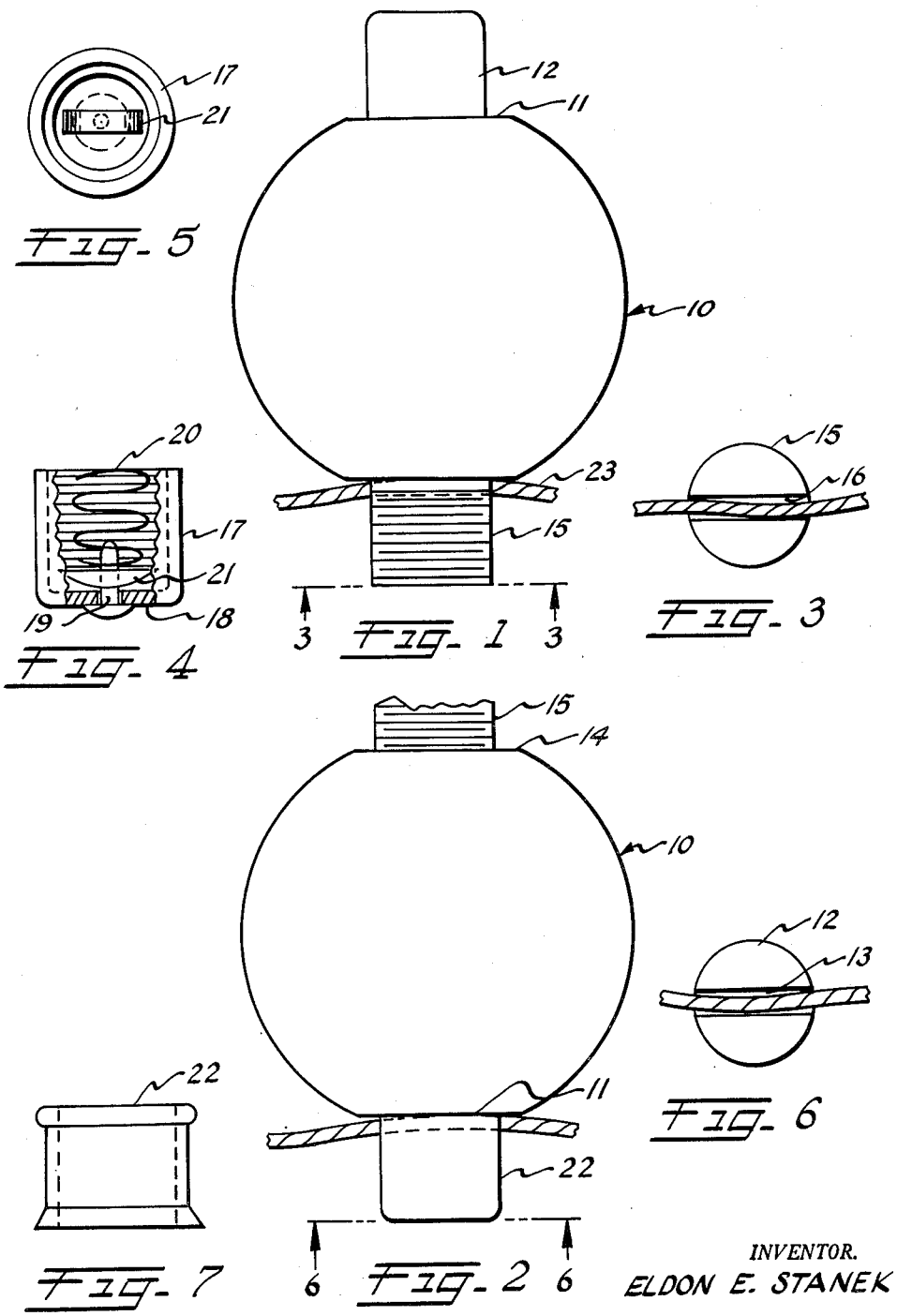

3,037,319
ADJUSTABLE FISHING FLOAT
Eldon E. Stanek, 2009 Tenth Ave., Belle Plaine, Iowa
Filed Sept. 7, 1961, Ser. No. 136,518
1 Claim. (Cl. 43—44.95)

This invention relates to fishing floats and more particularly to that type of fishing float that is adjustable. The advantages of this type of float are so well known to those experienced in the art of fishing that a review of the same is entirely unnecessary at this time other than to say that while the basic purpose of this form of float is as the name implies, to be adjustable (for any desired depth of fishing), none, to my knowledge are entirely satisfactory for more reasons than one as will hereinafter be shown.

It is, therefore, one of the objects of this invention to provide an adjustable fishing float that can not only be positively adjusted in a minimum of time, but one that will effectively stay adjusted as long as it is so wanted.

Another object of this invention is to provide an adjustable fishing float that can readily be used for stationary fishing as well as from a moving boat.

Another object of this invention is to provide an adjustable fishing float that is made entirely of plastic or any similar material.

Another object of this invention is to provide an adjustable fishing float that will stay at its desired place on the line regardless of any variations in the line itself.

Another object of this invention is to provide an adjustable fishing float that can readily be manufactured and sold to the fishing public at a low cost, that is well within the reach of every fisherman.

Another object of this invention is to provide an adjustable fishing float that can have more than one line secured to the same should it be so desired.

Another object of this invention is to provide an adjustable fishing float having a cap with octagonal sides that more readily provide an easy grip especially when one's hands are wet.

Another object of this invention is to provide an adjustable fishing float that can be manufactured with either a hollow or solid float as may be desired.

Still another object of this invention is to provide an adjustable fishing float that can have a rubber washer on one end thereof that will act as a shock absorber for the cord and thus prevent it breaking should a fish give a sudden jerk on the same.

Other and further objects and advantages of this most unusual and new adjustable fishing float will be hereinafter described, and the novel features thereof defined in the appended claim.

Referring to the drawing:
FIG. 1 is a side view of this invention with the screw cap removed, and the line in place on this end.

FIG. 2 is a side view of this invention turned completely over with the slipon cap at the bottom and the line in place on this end.

FIG. 3 is a view taken substantially along line 3—3 of FIGURE 1 as viewed in the direction indicated by the arrows.

FIG. 4 is a detail side view of a screw cap broken away to show its internal construction.

FIG. 5 is a top view of FIGURE 4 but with the spring removed.

FIG. 6 is an end view taken substantially along line 6—6 of FIGURE 2 as viewed in the direction indicated by the arrows.

FIG. 7 is a side view of the slipon cap.

Similar reference characters refer to similar parts throughout the several views of the drawing.

Having reference now to the drawing in detail, there is generally indicated by the character 10 a fishing float body that may be either hollow or solid plastic or any other desired material. The said float body has a flattened portion 11 from which extends a short cylindrical member 12 having a slot 13 extending the full length thereof. The float also has a second flattened portion 14 that is diametrically opposite the first mentioned flattened portion 11. An externally threaded cylindrical member 15 having a slot 16 its full length is also secured to the foresaid float 10 from the said second stated flat portion 14.

An internally threaded cap 17 has a centrally located opening in its closed end 18 for reception of the spring locator 19. The said cap is normally screwed on the foresaid threaded cylindrical member 15. This particular feature of my novel invention is not illustrated in the appended drawing. A spring 20 has one end resting on the holder 21 in the said threaded cap 17 as clearly shown in FIGURE 4 of the drawing.

A slipon cap 22 that is illustrated by FIGURE 7 of the appended drawing of course fits on the already mentioned cylindrical portion 12 of this invention.

The actual way in which a fishing line is secured to this adjustable fishing float is almost self-explanatory when one examines the appended drawing where in FIGURE 1 it can be seen that the fishing line noted on the drawing by the reference character 23 is placed in the slot 16 of the short cylindrical member 12 of the float 10 and the slipon cap 22 is then placed over this said member on which it snugly fits thus securing the said line in its desired position as clearly shown in FIGURE 2 of the said appended drawing.

When it is desired to secure the fishing line on the other end of float 10 it is only necessary to place the line in slot 16 of the externally threaded cylindrical member 15 and then screw on the internally threaded cap 17 until the line is firmly locked in place by the same. The foresaid spring 20 of course holding the line in the desired position on the float 10.

When it is desired to attach two fishing lines to the same float 10, both of the above two operations are performed on the same float 10 only one of the fishing lines need go on to be attached to a pole or other object properly secured at the fisherman's end of the line.

From the foregoing it will now be seen that there is herein provided an improved adjustable fishing float which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

What I now claim as new is:
In an invention of the character described, comprising a plastic global buoyant float body having two flattened portions, one diametrically opposite the other, and a slotted cylindrical member secured at one end to one of the flattened portions of the said float, and an externally threaded and slotted cylindrical member secured to the other flattened portion of the said float, a slipon cap snugly fitted over the first mentioned cylindrical member and an internally threaded cap adapted to be screwed on the second mentioned cylindrical member, the said internally threaded cap embodying a closed end having an opening in the center thereof for the slidable reception of a spring locator, a spring holder having an opening in the center thereof placed on the said spring locator and within the internally threaded cap, and a serpentine spring also within the said internally threaded cap and said spring having one end resting on the said holder and over the said locator providing a positive spring lock for the said internally threaded cap to secure a fishing line to this end of the said body.

References Cited in the file of this patent

UNITED STATES PATENTS

| | | |
|---|---|---|
| 398,127 | Calley | Feb. 19, 1889 |
| 1,371,170 | Johnson | Mar. 8, 1921 |
| 2,163,483 | Carlisle | June 20, 1939 |
| 2,481,346 | Rigby | Sept. 6, 1949 |
| 2,764,838 | Singer | Oct. 2, 1956 |
| 2,881,552 | Miller | Apr. 14, 1959 |